US005538670A

United States Patent [19]

Ritschkoff et al.

[11] Patent Number: 5,538,670

[45] Date of Patent: Jul. 23, 1996

[54] WOOD PRESERVATION METHOD AND WOOD PRESERVATIVE

[75] Inventors: Anne-Christine Ritschkoff; Liisa Viikari; Leena Paajanen, all of Helsinki; Tiina Mattila-Sandholm, Espoo, all of Finland

[73] Assignees: Kymmene Oy, Helsinki; Koskisen Oy, Jarvela; Metsalitto Osuuskunta, Espoo, all of Finland

[21] Appl. No.: 232,100

[22] PCT Filed: Oct. 30, 1992

[86] PCT No.: PCT/FI92/00293

§ 371 Date: Apr. 29, 1994

§ 102(e) Date: Apr. 29, 1994

[87] PCT Pub. No.: WO93/08971

PCT Pub. Date: May 13, 1993

[30] Foreign Application Priority Data

Nov. 1, 1991 [FI] Finland ................................... 915166

[51] Int. Cl.[6] ................................................ A01N 33/00

[52] U.S. Cl. ............... 252/400.22; 252/397; 252/400.23; 106/15.05; 424/405; 424/409; 427/297; 427/393.4; 427/393; 427/397; 427/440; 428/537.1

[58] Field of Search ......................... 106/15.05; 424/405, 424/409; 428/537.1; 252/399, 397, 400.21, 400.22, 400.23; 427/297, 393.4, 393, 397, 440

[56] References Cited

U.S. PATENT DOCUMENTS

| | | | |
|---|---|---|---|
| 4,090,000 | 5/1978 | Hatcher | 427/393 |
| 4,382,105 | 5/1983 | Amundsen et al. | 427/370 |
| 4,479,936 | 10/1984 | Vandenbergh et al. | 424/93.47 |
| 4,530,963 | 7/1985 | DeVoe et al. | 525/54.1 |
| 4,849,053 | 7/1989 | Gentile, Jr. et al. | 162/76 |
| 4,872,899 | 10/1989 | Miller | 71/11 |
| 4,950,685 | 8/1990 | Ward | 514/479 |

FOREIGN PATENT DOCUMENTS

| | | |
|---|---|---|
| 244965 | 9/1993 | New Zealand . |
| WO91/00326 | 6/1990 | WIPO . |

OTHER PUBLICATIONS

Biosis 92:4312.

*The Isolation and Immunolocalization of Iron-Binding Compounds Produced by Gloeophyllum Trabeum*, Applied Microbiology and Biotechnology, 35, 805–809 (1991).

*Chemical Abstracts*, vol. 108, No. 2, p. 89 (1988).

*Primary Examiner*—Sharon Gibson
*Assistant Examiner*—Valerie Fee
*Attorney, Agent, or Firm*—Hoffmann & Baron

[57] ABSTRACT

The invention concerns a method and a preservative for protecting wood against decay. According to the method wood is treated with a wood preservative capable of preventing the growth and spread of fungi, said preservative containing at least one complexing agent which binds at least a portion of those metals, typically iron and manganese, naturally occurring in wood that are essential to the growth of fungi. The complexing agents employed can be, e.g., ethylenediaminetetra-acetate, ethylene diamine-di-o-hydroxyphenylacetate a polyphospate or a siderophore produced by a microorganisms. The wood preservative used in the method is water-borne and specific to the decay fungi attacking wood.

15 Claims, No Drawings

WOOD PRESERVATION METHOD AND WOOD PRESERVATIVE

This application is a 371 of PCT/FI92/00293, filed Oct. 30, 1992, published May 13, 1993, now WO 93/08971.

The present invention relates to a method for protecting wood against decay and similar degradation reactions caused by wood decay fungi and similar microorganisms which cause wood decay.

According to such a method, wood is treated with a preservative capable of preventing wood decay fungi and similar microorganisms, which have the capability of decomposing lignocellulosic compounds, from growing and spreading in wood.

The invention also concerns a wood preservative capable of preventing the growth and spread of wood decay fungi and similar microorganisms which cause wood decay.

Wood decay fungi and a number of other microorganisms can metabolically utilize the structural components of wood cells. Brown-rot fungi, for example, decompose only the cellulose and hemicellulose of the wood structure, while white-rot decay fungi can also utilize the lignin components of wood. Brown-rot decay is characterized by a rapid deterioration of strength properties of wood in the initial stage of decay even before any visible changes are evident. This fact is one of the reasons, why brown-rot wood decay fungi are the worst culprits in boreal climate zones for causing damages in timber and wood constructions, accounting for annual losses of several billions of Finnmarks through decay in sawn timber as well as residential and other buildings constructed with wooden components.

Wood can be protected chemically against damages caused by decay fungi by various preservation methods based on preservatives of varying efficacy. Wood preservatives employed in the art can be coarsely classified in three categories: 1) water-borne preservatives, 2) oil-borne preservatives and 3) creosote oil. An outline of each of these categories is given:

1) Fixing-type water-borne salt preservatives contain copper, chromium and arsenic (CCA preservatives) as the active components. Fixing-type preservatives are intended for a long-term protection of wood. Nonfixing salt-based preservatives employ various boron and fluorine compounds as the active components. The latter type of preservatives give a limited time of protection, since the protecting compounds are subject to leach-out by environmental moisture.

2) Oil-based preservatives contain one or more active constituents in an organic solvent, conventionally a light petroleum oil of the solvent naphtha grade. The active compounds can be tributyl tin naphthenate (TBTN), tributyl tin oxide (TBTO), mixtures of penta- and tetrachlorophenols, phoxim and dichlofluanid.

3) Creosote oil is a fraction of coal tar distilling above 200° C. Analysis of creosote oil has identified about 300 different compounds, most of them occuring in very low concentrations. The efficacy of creosote oil in the inhibition of organism growth is based on the synergetic preservative effect of its components.

Conventional wood preservatives have appreciable drawbacks. For instance, they contain toxic compounds thus necessitating approval by authorities for their use. The toxic effect of preservatives is based on a general toxicity, which affects all vital metabolic functions of living organisms such as, e.g., cell respiration and production of a high energy compound, ATP. Due to the broad toxic spectrum of such preservatives, appreciable health (e.g., carcinogenicity) and environmental (soil and waterway contamination) risks are involved with the use of conventional wood preservatives. Health risks are imposed on all eucaryotic organisms including plants, animals and man. If the content of copper, arsenic and chromium in a CCA preservative were decreased, however, problems in fixing the preservative into wood result, with a significant reduction of the preservative's efficacy paralleling the reduction of heavy metal concentrations.

It is an object of the present invention to overcome the drawbacks prior-art technology and to achieve an entirely novel method of wood preservation against decay, said method being specific to the degradation mechanism employed by fungi.

During the investigations leading to the present invention, an unexpected discovery has been made which reveals that by binding iron and other transition metals contained in wood into chelate compounds, a significantly inhibitory effect acting on the growth and spread of fungi is achieved. It has namely been proven that in the degradation of crystalline cellulose performed by, e.g., brown-rot fungi, a degradation route is employed that is based on oxidative reactions in which transition metals contained in wood, particularly trivalent iron, play a crucial role. In this process, extracellularly formed compounds of low molecular weight resulting from the fungal metabolism react with the iron incorporated in wood, the 10 end result of the reactions releasing strong oxidizers such as, e.g., oxygen and hydroxyl radicals which cleave wood carbohydrates into shorter chains that are attacked by the hydrolytic enzymes produced by the fungi thus releasing free sugars for the metabolic cycles of fungi. Hence, iron contained in wood is important to both the spread of fungi and start of the decay process.

In addition to acting as pivoting element in the oxidative decay process, iron also is incorporated as an essential element in several enzymes participating in wood decay and performing other vital functions for fungi. As for brown-rot fungi, the iron content of the growth substrate is also crucial to the growth and spread of white-rot, soft-rot and mold fungi in the wood structure. Besides iron, other transition metals such as manganese (Mn) may participate in the reactions of the decay process. In addition to participating in the decay process, iron and other metals have a great importance to the growth of microorganisms. Therefore, without a sufficient supply of metals, particularly iron, harmful organisms have no chance of growth and reproduction.

In accordance with the above-described grounds, the wood preservation method according to the invention is based on the treatment of wood by an effective amount of a complexing agent sufficient for at least a partial binding of metals occurring in wood in native form. Transition metals essential to the growth and spread of microorganisms, particularly iron and manganese, are bound.

More specifically, the method in accordance with the invention a method of treating wood with a wood preservative containing at least one complexing agent which binds at least a portion of those metals naturally occurring in wood that are essential to the growth of microorganisms which cause wood decay.

Furthermore, the wood preservative according to the invention is comprised of at least one complexing agent capable of forming metal complex compounds with those metals naturally occurring in wood that are essential to the growth of microorganisms which cause wood decay.

In the context of this application, the term "complexing agent" (or "chelating agent") refers to a compound which is capable of binding di- or trivalent cations into insoluble or soluble complex compounds.

Complexing agents can be categorized into inorganic and organic compounds. Inorganic complexing agents are different kinds of cyclic and linear sodium polyphosphates ($Na_5P_3O_{10}$). The most important organic complexing agents can be categorized into aminocarboxylates having acetic acid as their acid pan (EDTA, NTA, DTPA), hydroxycarboxylates which are salts of polyhydroxy acids (gluconic acid, glucoheptonic acid and other sugar acids) and organophosphates having phosphoric acid as their acid pan (ATMP, HEDP, EDTMP, DTPMP). The efficacy of a complexing agent can be evaluated by determining its equilibrium constant in the complexing reaction. The higher the value of the equilibrium constant K, the smaller the number of free metal ions remaining nonreacted in the presence of the complexing agent. The thermodynamic stability of the formed complexes, that is, the complexing capability of the complexing agent is generally characterized by the logarithm of the equilibrium constant.

Siderophores are complexing agents produced by microorganisms that are capable of binding metal ions (e.g., iron) from the growth substrate for the use of the organism. The siderophores produced by some bacteria (Pseudomonas sp.) have been found to possess an inhibiting function to the growth of other microorganisms, based on the strong affinity of their siderophores for the iron contained in the growth substrate.

The examples to be described below were carried out using the following complexing agents that have proven effective in the method according to the invention: ethylenediaminetetra-acetate (EDTA), ethylenediamine-di-(o-hydroxyphenylacetate (EDDHA), sodiumpolyphosphate ($Na_5P_3O_{10}$) and a commercially available siderophore model compound, desferal.

According to the invention the outer surface of wood, principally fallen timber, is saturated as deep as possible with such a preservative solution in which a complexing agent or a mixture of several complexing agents is the active component. In an embodiment of the invention the goal is to convert a maximally high portion of transition metals contained in the wood structure into an essentially insoluble form, whereby the metals are prevented from participating in the growth process reactions of fungi. In another embodiment, the transition metals are converted into soluble complexes, whereby they can be at least partially removed from the wood by leaching. According to the latter embodiment, wood can be leached at least partially, e.g., by its surface, free from transition metals. It must be noted that with regard to the growth of fungi, the solubility properties of the transition metal complex are nonessential, because the transition metal (particularly iron) bound as a soluble complex is also in a form unavailable to the metabolism of fungi.

The concentration of the complexing agent(s) in the solution can be varied in a wide range. Typically a concentration of approx. 0.01 . . . 10.0%, advantageously approx. 0.1 . . . 5% of the solution weight is used. Water is advantageously used as the solvent, and the wood preservative can also contain other conventionally known additives that aid the penetration of the solution into wood. Besides biologically inert additives, the wood preservative according to the invention can contain biologically active compounds known in the art such as copper ions or copper complexes.

The invention provides significant benefits. For example, as mentioned above, the wood preservative according to the invention is water-borne, and in this sense environmentally compatible. Neither does it contain any so-called broad-spectrum poisons, but rather, is very specific to such microorganisms occurring in wood, in particular fungi, that cause decay. The method according to the invention utilizes efficiently the capabilities of chemical complexing agents and siderophores produced by microorganisms for binding iron, other transition metals and biologically active components contained in a growth substrate to the end of preventing the growth and spread of fungi.

In the following the invention is examined in detail with the help of a few exemplifying embodiments.

EXAMPLE 1

The test was performed using four brown-rot fungi most widely spread in Finland and causing the greatest damages: dry-rot fungus (*Serpula lacrymans*), cellar fungus (*Coniophora puteana*), white-pore fungus (*Poria placenta*) of the Anthrodia family and sauna fungus (*Gloeophyllum trabeum*) of the Coniaphoraceae family.

Growth medium: A synthetic culture medium containing 5% malt extract and 3% agar—agar in distilled water. A necessary amount (25 mM or 50 mM) of the chelating agent to be tested was also dissolved in the distilled water. This culture medium was then sterilized by autoclaving for 30 min under 1 atm pressure at +120° C. Subsequent to sterilization, the culture medium was divided into 15 ml aliquots placed in sterile disposable petri dishes (90x90 mm).

Chelating agents: Ethylenediamine-di-(o-hydroxyphenylacetate (EDDHA), ethyl-enediaminetetra-acetate (EDTA), polyphosphate ($Na_5P_3O_{10}$). The concentrations of solutions to be tested were 25 mM and 50 mM.

The fungus to be tested was grafted in an agar—agar piece of approx. 7x7 mm size onto a growth medium containing a chelating agent. The fungal growth was logged by measuring the diameter of the fungus colony every second day. The control culture, against which the results obtained from the chelating agent containing culture media were compared, was grown on a conventional malt extract medium (5% malt extract, 3% agar—agar in distilled water) not containing a chelating agent. All tests were performed using a set of 5 parallel dishes, whose results are given in the table as computed averages. The growth of the fungi was continually monitored until the control dishes were full (85 x 85 mm).

Effect of chelating agents on the growth of fungi on a synthetic growth medium; the diameter of the fungus colony is given in millimeters:

| Fungi: |
|---|
| 1 = *G. trabeum*<br>2 = *S. lacrymans*<br>3 = *C. puteana*<br>4 = *P. placenta.* |

TABLE 1A

Test series for 25 mM concentration of tested chelating agent

| | 1 | 2 | 3 | 4 |
|---|---|---|---|---|
| Control growth medium | 85 | 85 | 85 | 85 |
| EDDHA | 7 | 7 | 7 | 7 |
| EDTA | 21 | 30.3 | 80 | 70.8 |
| Polyphosphate | 27.7 | 21.3 | 85 | 7 |

TABLE 1B

| Test series for 50 mM concentration of tested chelating agent | 1 | 2 | 3 | 4 |
|---|---|---|---|---|
| Control growth medium | 85 | 85 | 85 | 85 |
| EDDHA | 7 | 7 | 7 | 7 |
| EDTA | 10.3 | 25 | 38 | 33.5 |
| Polyphosphate | 7.8 | 7 | 9.3 | 7 |

Note: Since the original graft's diameter was 7 mm, this value in the above tables indicates zero (0) fungal growth as is the case for, e.g. the chelating agent EDDHA.

EXAMPLE 2

Fungi: The same as in Example 1.

Growth medium: A sawdust culture medium containing 1% spruce sawdust. The spruce sawdust was autoclaved separately for each culture medium. Into each sterile disposable petri dish (90x90 mm) was dosed a 3 g aliquot of spruce sawdust, which was moistened with a 30 ml aliquot of autoclaved agar—agar-containing solution (1% agar—agar) containing the chelating agent (concentration 10 mM or 50 mM) so as not to leave an aqueous layer of the agar—agar solution on the culture medium.

Chelating agents: The same as in Example 1; the concentrations of solutions to be tested were 10 mM and 50 mM.

The fungus to be tested was grafted onto a growth medium containing a chelating agent in the manner described in Example 1. The fungal growth was logged by measuring the diameter of the fungus colony every second day. The results were compared against fungal growth on a control growth medium. The control growth medium was formed by a sawdust culture medium not containing a chelating agent. All tests were performed using a set of 5 parallel dishes, whose results are given in the table as computed averages. The growth of the fungi was continually monitored until the control dishes were full.

Effect of chelating agents on the growth of fungi on a sawdust culture medium; the diameter of the fungus colony is given in millimeters:

1=*G. trabeum*
2=*S. lacrymans*
3=*C. puteana*
4=*P. placenta*

TABLE 2A

| Test series for 10 mM concentration of tested chelating agent | 1 | 2 | 3 | 4 |
|---|---|---|---|---|
| Control growth medium | 85 | 85 | 85 | 85 |
| EDDHA | 7 | 7 | 7 | 7 |
| EDTA | 46.4 | 28.7 | 74.1 | 72.4 |
| Polyphosphate | 65.4 | 37.4 | 85 | 59.4 |

TABLE 2B

| Test series for 50 mM concentration of tested chelating agent | 1 | 2 | 3 | 4 |
|---|---|---|---|---|
| Control growth medium | 85 | 85 | 85 | 85 |
| EDDHA | 7 | 7 | 7 | 7 |
| EDTA | 10.6 | 17.6 | 43.6 | 36.2 |
| Polyphosphate | 7 | 7 | 7 | 7 |

Also in the above tables the numeric value 7 is equal to the initial diameter of the graft.

EXAMPLE 3

Fungi: Sauna fungus (*Gloeophyllum trabeum*), white-pore fungus (*Poria placenta*) and cellar fungus (*Coniophora puteana*).

The initial dry weights of sapwood pine test pieces were determined. The test pieces were pressure impregnated with an aqueous solution containing a chelating agent (50 mM), and the pieces were dried to ambient humidity in room temperature. The test pieces were sterilized by autoclaving. The test pieces were placed in kolle flasks filled with an aqueous solution of agar—agar so that each dish contained 3 treated and 3 untreated test pieces. The fungus to be tested was grafted on the test pieces. The control cultures of the test were kept in kolle flasks containing untreated test pieces only.

Chelating agents: 50 mM EDTA, 50 mM polyphosphate.

The decay test was performed in a modified manner according to the international standard EN 113 with the decay time being 10 weeks. After the lapse of this time, the kolle flasks were opened and the test pieces were dried for determination of dry weight. The weight losses caused by the fungi were determined from the measured weights. The weight loss percentages were compared to those of the control media and results obtained by the use of conventional preservatives.

The results indicate that the weight losses of sapwood pine-test pieces treated with 50 mM chelating agent concentrations are almost negligible. Removal of iron from the availability to the fungal metabolism prevented the decay process by the fungus entirely. The results are given in the table below.

TABLE 3

Results of decay tests according to modified EN 113 standard. Results for control test piece are given to the right of the result for the treated test piece.

| Treatment | Weight loss (%) | | | | | |
|---|---|---|---|---|---|---|
| (50 mM) | Cp | Control | Prp | Control | Gl | Control |
| EDTA | 1.2 | 27.9 | 0.1 | 39.4 | 4.9 | 44.4 |
| Phosphate | 0.4 | 20.0 | 0.3 | 46.2 | 0 | 27.1 |
| Control culture | 24.5 | | 33.9 | | 23.0 | |

Note: Cp refers to cellar fungus (*Coniophora puteana*), Prp to white-pore fungus (*Poria placenta*) and Gl to sauna fungus (*Gloeophyllum trabeum*).

EXAMPLE 4

Use of a purified commercial-grade siderophore, desferal, for preventing fungal growth.

Fungi: dry-rot fungus (*Serpula lacrymans*).

Growth medium: A sawdust culture medium containing 1% spruce sawdust in distilled water. Desferal was dissolved in the distilled water of the culture medium. A 2 g aliquot of sterilized sawdust was weighed into a sterile disposable petri dish, then the sawdust was moistured with 15 ml aqueous solution of agar—agar (1% agar—agar) containing autoclaved siderophore (concentrations 5 mM and 15 mM).

Chelating agent: Purified 5 mM and 15 mM solutions of siderophore (desfetal).

The fungus to be tested was grafted in an agar—agar piece of approx. 7x7 mm size onto the growth medium. The fungus (dry-rot fungus) was grown in dark at 18° C. The fungal growth was logged by measuring the diameter of the fungus colony every second day. The results were compared against those of control dishes (sawdust culture medium, not containing desfetal). AH tests were performed using a set of 5 parallel dishes. The growth of the fungi was continually monitored until the control dishes were full.

The results are given in Table 4 below:

TABLE 4

Use of a siderophore for preventing fungal growth.

| Fungus | Control growth medium | Desferal 5 mM | Desferal 15 mM |
|---|---|---|---|
| *S. lacrymans* | 85.0 | 19.7 | 8.9 |

The results indicate that the diameter of the grown fungus colony in samples treated with desferal is significantly smaller than in control samples, which proves the efficacy of siderophores as the active component of a wood preservative in a method according to the invention.

EXAMPLE 5

Fixation and solubility determination of the EDTA-iron complex

In this example the solubility of the EDTA-iron complex formed in wood was tested. Wood test pieces made of pine sapwood were impregnated with 50 mM EDTA. After impregnation the test pieces were rinsed in distilled water for 1 . . . 2 hours. The iron contents of the test pieces, test piece rinsing water, untreated control pieces and control piece rinsing water were determined using flame atomic absorption spectrometry techniques. Prior to the determination, the wood material was incinerated. The ash content of the entire weight was less than 1%. The Fe contents of the liquids were determined directly. The Fe contents were computed for the wood material using the average of 10 test pieces and for the liquids using a volume of 100 ml. The results of iron content determinations are given in the table below:

TABLE 5

Iron contents of wood pieces after rinsing.

| Sample | Fe content (μg/wood material and μg/100 ml) |
|---|---|
| 1 | 1.16 |
| 2 | 1.61 |
| 3 | 0.6 |
| 4 | 0.2 |

1 = Test pieces treated with EDTA after rinsing
2 = Control pieces
3 = Distilled water used for rinsing
4 = Control water The results prove that the EDTA-iron complex formed into wood is at least partially soluble and leached out from wood by moisture. A further conclusion drawable from the results is that iron leached from the test pieces is retained in the rinsing water. With regard to the growth of a fungus, the solubility of the iron complex is nonessential, because the iron in this form is yet in a form (as a complex) unavailable to the metabolism of the fungus.

We claim:

1. A method for protecting wood against decay and similar degradation reactions caused by wood decay fungi and similar microorganisms which cause wood decay, comprising treating wood with a wood preservative solution containing at least one complexing agent selected from the group consisting of cyclic sodium polyphosphates, linear sodium polyphosphates, aminocarboxylates, hydroxycarboxylates, organophosphates and siderophores, wherein said complexing agent binds at least a portion of those metals naturally occurring in wood which are essential to the growth of such microorganisms that cause wood decay.

2. The method as claimed in claim 1, wherein said complexing agent binds to a substantial portion of said metals in said wood.

3. The method as claimed in claim 1, wherein said complexing agent binds to at least a substantial portion of iron and manganese in said wood.

4. The method as claimed in claim 1, wherein said metals bind to said complexing agents to form insoluble complex compounds which are insoluble in said wood preservative solution.

5. The method as claimed in claim 1, wherein said hydroxycarboxylate complexing agent is ethylene diamine-tetra-acetate.

6. The method as claimed in claim 1, wherein said hydroxycarboxylate complexing agent is ethylene diamine-di-(o-hydroxyphenyl-acetate).

7. The method as claimed in claim 1, wherein said linear polyphosphate complexing agent is sodium polyphosphate.

8. A method of preserving wood comprising: treating said wood with a wood preservative solution containing an amount of at least one complexing agent effective to bind at least a portion of transition metals found in said wood essential to the growth and spread of microorganisms which cause wood-decay, thereby rendering said transition metals unavailable for metabolism by said microorganisms.

9. The method as claimed in claim 8, wherein said complexing agent comprises an inorganic complexing agent for binding said transition metals.

10. The method as claimed in claim 8, wherein said complexing agent comprises an organic complexing agent for binding said transition metals.

11. The method as claimed in claim 8, wherein said complexing agent comprises a microbiologically produced complexing agent or siderophore for binding said transition metals.

12. The method as claimed in claim 8, wherein said complexing agent is a complexing agent that forms insoluble complex compounds with said transition metals.

13. The method as claimed in claim 8, wherein said complexing agent is selected from the group consisting of ethylenediaminetetra-acetate, ethylenediamine-di-(o-hydroxyphenylacetate, polyphosphate, a siderophore produced by a microorganism, and mixtures thereof.

14. The method as claimed in claim 8, wherein said wood preservative solution contains said complexing agent in a concentration of about 0.01 to about 10 wt.%.

15. The method as claimed in claim 14, wherein said concentration of said complexing agent is about 0.1 to about 5 wt.%.

* * * * *